June 11, 1957 A. V. HAEFF 2,795,727

DIRECT-VIEWING ELECTRONIC STORAGE TUBES

Filed Jan. 12, 1952 6 Sheets-Sheet 1

INVENTOR.
ANDREW V. HAEFF,
BY Nicholas T Volsk
ATTORNEY.

INVENTOR.
ANDREW V. HAEFF,
BY Nicholas T Volok
ATTORNEY.

June 11, 1957 A. V. HAEFF 2,795,727

DIRECT-VIEWING ELECTRONIC STORAGE TUBES

Filed Jan. 12, 1952 6 Sheets-Sheet 3

INVENTOR.
ANDREW V. HAEFF,
BY Nicholas T Volk
ATTORNEY.

DIRECT-VIEWING ELECTRONIC STORAGE TUBES

INVENTOR.
ANDREW V. HAEFF,
BY Nicholas T Volsk
ATTORNEY.

CHARGING CURRENT V. POTENTIAL OF TARGET ELEMENT

COMPOSITE CHARGING CURRENT V. POTENTIAL OF TARGET ELEMENT

METHOD OF CHARGING STORAGE SCREEN

INVENTOR.
ANDREW V. HAEFF,
BY Nicholas T Volsk
ATTORNEY.

INVENTOR.
ANDREW V. HAEFF,
BY Nicholas T Volsk
ATTORNEY.

United States Patent Office 2,795,727

Patented June 11, 1957

2,795,727

DIRECT-VIEWING ELECTRONIC STORAGE TUBES

Andrew V. Haeff, Pacific Palisades, Calif., assignor, by mesne assignments, to Hughes Aircraft Company, a corporation of Delaware Application January 12, 1952, Serial No. 266,137

12 Claims. (Cl. 315—12)

This invention relates to direct-viewing electronic storage tubes and more particularly to direct-viewing electronic storage tubes for presenting a series of applied electrical signals as a corresponding series of visual images, each of the visual images persisting until converted into the immediately succeeding visual image by the application of the electrical signal to which the immediately succeeding visual image corresponds. A tube of this type is suitable for both color and black and white presentations of the applied signals.

One of the most desirable characteristics of an indicator tube is that each element of its viewing surface emit light in proportion to the signal received for that element. An ideal tube would be the one in which each element would emit light continuously at a level determined by the received signal until the new signal, received for that element, changes the light level to a new value. The more conventional radar indicator tubes or television kinescopes, while satisfying reasonably well the requirement of proportionality of light-to-signal, do not emit light continuously due to rapid decay of luminescence of phosphor. The effect of continuous light emission is achieved in television by frequent excitation of the screen (high frame rate) which is compatible with the persistence of vision. The frame rate must be even higher in color television in order to avoid the flicker effect as portions of the picture may be predominantly of one of the three basic colors. This requires transmitting many more frames or complete pictures than required for continuity of movement. If an "ideal" presentation device were used wherein the light output is continuous and the new signal simply "resets" the level of light output for each element of the viewing surface, the frame repetition rate could be reduced considerably, say to 12–16 frames a second vs. 100 frames now required for reproduction of color images. This reduction in frame rate could be used either to reduce the bandwidth required for transmitting a picture of given resolution or, since for television purposes the bandwidth has been standardized at 6 mc. per channel, an "ideal" presentation device would permit considerable improvement in picture detail for the same total bandwidth.

This invention discloses several storage tubes in which a reasonable approximation to the performance of an "ideal" presentation device can be achieved. In accordance with this invention, the received signal is used to control the effective potential of each elemental area of the storage surface. Each elemental area then acts as a control grid similar to that of a triode, for example, to control the flow of electrons towards a luminescent viewing screen. In order to approximate the performance of the ideal presentation device, the potential on each storage element should be capable of being quickly changed to a new potential corresponding to the signal voltage and this potential maintained without appreciable change during the whole frame period or until a new signal for that element is received. Of course, reasonable correspondence between the signal voltage and the light output should also be achieved. In the devices of the prior art, the relatively rapid decay of light output from an element of the viewing screen after excitation of such element contributed to the flicker difficulties but was essential for the presentation of moving pictures. A very long persistence phosphor could not be used on the screen of the known television receiving tubes because, without decay, the whole screen would saturate and assume almost uniform brightness. However, in an ideal device essentially infinite persistence can be used very effectively provided the incoming signal is able to reset the level of light output in either direction for each element of the picture in accordance with the latest available information in the latest signal received. Of course in certain cases, such as radar, for example, it may be more desirable to permit a degree of signal integration to improve visibility through noise. As will be explained more fully in the specification, this can be achieved by allowing the potential on the elements of the storage surface to decay slower after responding to the signals so that the effective potential of each element is the summation of signals received during several consecutive scans.

It is, therefore, an object of this invention to provide a storage tube device with a storage screen on which a charge distribution can be reset either in a positive or in a negative direction with each application of a signal.

Another object of this invention is to provide a direct-viewing storage tube in which a visual image having a dynamic range corresponding to a video signal and a continuous presentation which is changed by resetting the charge distribution in either direction on the storage screen when a new signal is produced, with the concomitant reduction in flicker.

A further object of this invention is to provide a direct-viewing color storage tube in which a visual image is reproduced with dynamic range and with the continuous and simultaneous presentation of several color fields.

A still further object of this invention is to provide a direct-viewing storage tube capable of producing a presentation with dynamic range and also capable of integrating or reinforcing the visual image over several scans for increasing the signal-to-noise ratio.

The novel features which are believed to be characteristic of the invention, both as to its organization and method of operation, together with further objects and advantages thereof, will be better understood from the following description considered in connection with the accompanying drawings, in which several embodiments of the invention are illustrated by way of example. It is to be expressly understood, however, that the drawings are for the purpose of illustration and description only, and are not intended as a definition of the limits of the invention.

Figure 1:
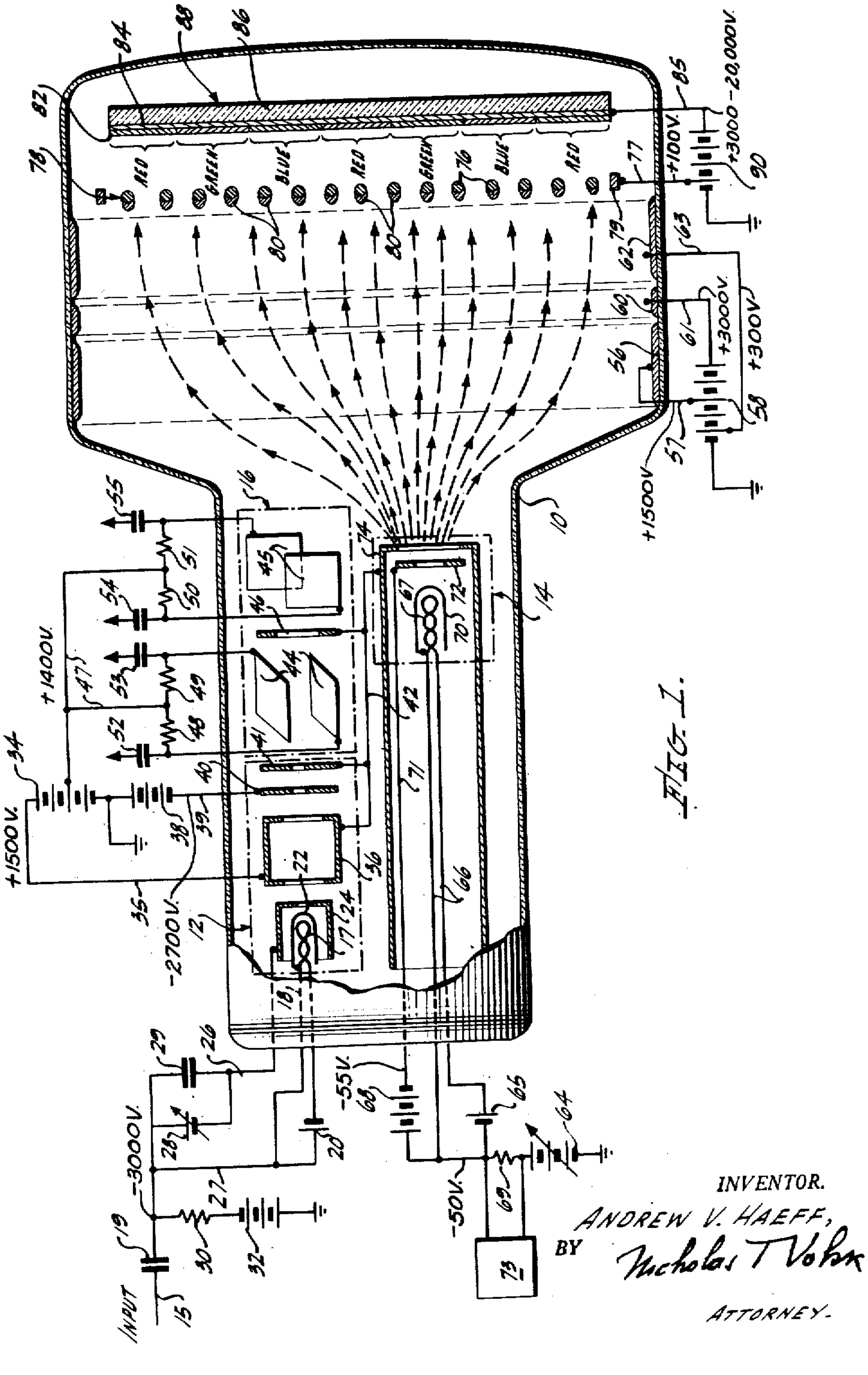
Fig. 1 illustrates a longitudinal sectional view of one embodiment of the direct-viewing color storage tube.

The storage tube illustrated in Fig. 1 will produce a visible image in accordance with a video signal either of black and white variety or in color, the image being reset from one frame to the next so that it appears continuously thus eliminating the problem of flicker. In the case of a color presentation, each color field is presented continuously and simultaneously, making it unnecessary to increase the frame rate in order to solve the flicker problem.

Referring to Fig. 1, the tube comprises an evacuated envelope 10 which, in its left portion as viewed in the figure, has a writing gun 12 with appropriate electron beam deflecting means 16, and a flood gun 14. The writing gun consists of a conventional heater element 17 connected by means of conductors 18 to a source of filament potential 20, a button-type cathode 22, intensity grid 24, and beam-forming and accelerating electrodes 36, 40 and 41. The accelerating electrode 36 is connected through lead 35 to the positive terminal of a source of direct potential 34 which holds this electrode at some suitable potential which may be of the order of 1500 volts. The electrode 41 is also connected to the same positive potential through lead 42 while electrode 40 is connected through lead 39 to a negative source of potential 38. Electrode 40 should be maintained at a potential of approximately 300 volts positive with respect to the potential of cathode 22. The cathode 22 is connected to a biasing potential source 32 through a signal load resistor 30 and conductor 27. Intensity grid 24 is maintained negative with respect to cathode 22 by connecting it to the cathode through lead 26, variable direct potential source 28, and lead 27. Variable direct potential source 28 is bypassed for alternating potentials by capacitor 29. Video signal is applied at terminal 15 through capacitor 19 to the cathode 22 and through capacitor 29 to intensity grid 24 so as not to vary appreciably the flow of electrons in the electron beam. The quiescent negative potential of cathode 22 is dependent to a large extent on the characteristics of the storage screen but will be in the neighborhood of −3000 volts with respect to ground. The operation and construction of the electron gun structure of this type is well known in the art and therefore needs no additional description.

The writing gun 12 has electron beam deflecting means 16 comprising vertical deflection plates 44 and horizontal deflection plate 45 shielded from each other by electrode 46 which is maintained at the same positive potential as electrode 41 by lead 42. While electrostatic deflecting means are illustrated in the figure, it is to be understood that magnetic beam deflection coils may also be used, in which case the horizontal and vertical deflection plates are replaced with appropriate magnetic deflection coils. Direct-current potential from source 34 is applied to the vertical and horizontal deflection plates, through leads 47 and isolation resistors 48, 49, 50, and 51, respectively, so that the deflection plates are at a suitable positive potential which may be on the order of 1400 volts. Capacitors 52, 53, 54 and 55, couple resistors 48 through 51, respectively, to suitable sources of balance scanning voltages, the circuitry for which is not illustrated in the figure. The disclosed tube is in no way restricted to a particular mode of scanning and, since suitable scanning circuits are known in the art, no detailed description of any scanning circuit is presented.

Flood gun 14 includes a conventional heater element 67 connected through a pair of conductors 66 to a source 65 of filament potential, a cathode 70, a beam-forming electrode 72, and an accelerating electrode 74. Electrode 74 extends over electrode 72 to shield flood gun 14 from writing gun 12 and deflecting means 16. Beam-forming electrode 72 is connected through a lead 71 to the negative terminal of a source 68 of direct-current potential, the positive terminal of which is connected to cathode 70. Source 68 may produce a potential of the order of −5 volts. The potential of flood gun cathode 70 is dependent on the patricular mode of operation. An appropriate value for the paricular mode being described is −50 volts with respect to ground. This potential is applied through a resistor 69 from a variable potential source 64. A small magnitude alternating-current potential of sawtooth waveform of a frequency of several megacycles may be impressed on flood gun cathode 70 to effect an artifical velocity spread to the flood electrons. The magnitude of this alternating-current potential is dependent on the uniformity of the secondary emission characteristics of the storage surface and may be of the order of 2 volts peak-to-peak. This artificial velocity spreading potential is applied across resistor 69 by means of a connection to a source 73.

The configuration of the electrodes 72 and 74, and especially the diameter of the openings in these electrodes, is such that a diverging electron beam is produced by gun 14. The electron optics of the flood gun should be such as to produce a uniform density of the primary electrons in the plane of a storage screen 78 toward which this "flood beam" is directed. The electric field of a pair of electrodes 56 and 60 form the "electron optics" for the flood beam. These electrodes are maintained at a sufficiently positive potential to cause the flood beam electrons passing through the regions dominated by the electrodes to spread out evenly over storage screen 78 and impinge on each portion of it at normal incidence. Electrode 56 is maintained at an appropriate positive potential by means of a connection through a conductor 57 to an intermediate point of a potential source 58, the negative terminal of which is connected to ground. The magnitude of the potential applied to electrode 56 may be of the order of 1500 volts. Electrode 60 is maintained at an appropriate positive potential by a connection through a conductor 61 to the positive terminal of potential source 58, the magnitude of this potential being of the order of 3000 volts.

A collector electrode 62 is mounted within envelope 10 to the right of electrode 60, as viewed in Fig. 1, and operates to attract secondary electrons liberated from storage screen 78. Electrode 62 is maintained at an appropriate positive potential by a connection through a lead 63 to an intermediate tap of potential source 58. A representative value for the voltage applied to electrode 62 is +300 volts.

Continuing now with the description of the elements in the right portion of evacuated envelope 10, as viewed in Fig. 1, a storage screen 78 is mounted within envelope 10 in a position facing the electron guns. Storage screen 78 a portion of which is illustrated on a large scale in Figs. 2 and 3 includes a flattened-out fine metallic mesh 76 stretched between a hoop ring 79. One suitable material for mesh 76 is stainless steel which offers several advantages such as, for example, resistance to corrosion during the degassing process of the tube, and sufficient strength to retain a flat configuration when stretched between hoop ring 79 used for supporting screen 78. Other metals or alloys having similar properties can be used for mesh 76, one of these being nickel.

The size of mesh 76 may be of the order of 250 wires per inch, with the diameter of the wire being of the order of 1.5 to 2 mils. The limits of the number of wires per inch and the diameter of the wire used for making mesh 76 are not especially critical. When mesh 76 consists of horizontal wires and vertical wires, the screen, prior to its additional processing which is described below, is subjected to a flattening-out process in a hydraulic press. Sufficient pressure is exerted by the two flat surfaces on the mesh 76 to compress the cross-over wire junctions so that the center lines of the vertical and horizontal wires are in substantially the same plane as illustrated in Figs. 2 and 3.

One side of mesh 76 is coated wih a dielectric material which has a very high specific resistance. The surface of the dielectric material constitutes a storage surface 80 for the tube. Suitable dielectric materials are phosphors, especially P1 (cubic-$Zn_2$ $SiO_4$:Mn) or P11 (cubic-ZnS:Ag) and silicon dioxide. The process of applying a coating of phosphor to mesh 76 includes drawing a high velocity stream of clean air through the mesh and, at the same time, spraying the mesh from an air gun at a range of approximately 0.5 inch with an emulsion of phosphor suspended together with a binder in a liquid such as butyl acetate, one suitable binder being nitro-cellulose. Storage surface 80 is produced by holding the spray gun so as to make the particles of the dielectric follow the free stream of air and travel in a direction normal to the mesh. Should a silicon dioxide coating be desired, it can be applied by the conventional method of evaporating silicon dioxide in layers on mesh 76.

Figure 2:
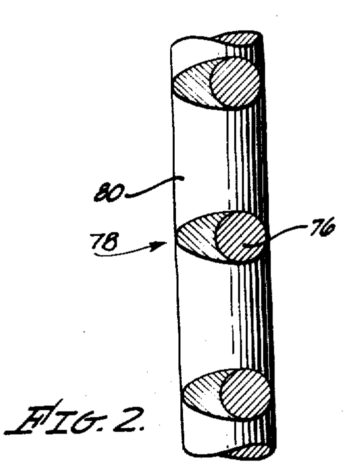
Figs. 2 and 3 illustrate a cross-sectional view and a plan view, respectively, of the storage screen of the tube illustrated in Fig. 1.
Figure 3:
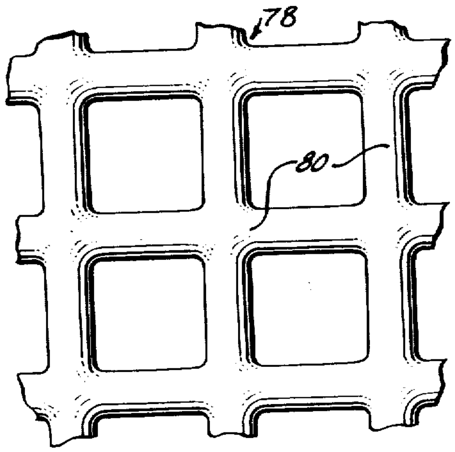

The general configuration of storage surface 80, as shown in Fig. 2, is semi-elliptical in cross-section, it being understood, of course, that other cross-sectional configurations, such as rectangular and triangular, may also be used. As shown in Figs. 1 and 2, storage surface 80 faces towards the electron guns and extends along lines parallel to the longitudinal axis of the tube. The thickness of storage surface 80 along these lines determines the amount of control exerted by screen 78 on the flow of electrons through the interstices of the screen, this thickness preferably being of the order of one to two times the diameter of wires comprising mesh 76. The overall transparency of screen 78 is not critical and may vary between wide limits, such as, for example, 20% to 70% transparency.

After the coating of dielectric material is deposited on the mesh 76, screen 78 is subjected to a baking process in an oven in order to bind the dielectric more closely to the mesh 76 and, at the same time, to solidify the binder. While the drawings illustrate screen 78 as being composed of horizontal and vertical wires, it is to be understood that the vertical wires may be eliminated, provided the mechanical strength of the remaining wires is sufficient to retain the desired configuration.

Mesh 76 of storage screen 78 is utilized as a contrast control grid in the disclosed storage tube and is maintained at an appropriate potential so as to regulate the flow of primary electrons through the interstices of storage screen 78 towards a viewing screen 88 as explained later. Accordingly, mesh 76 will henceforth be referred to as contrast control grid 76. An appropriate potential for contrast control grid 76 may be of the order of +100 volts with respect to ground and is applied from a source 90 of direct-current potential through a lead 77 connected between ring 79 and an intermediate terminal of a source 90 of direct-current potential.

Viewing screen 88 is positioned within envelope 10 closely adjacent to storage screen 78 i. e. contiguous thereto, and to the right thereof, as viewed in Fig. 1. Viewing screen 88 comprises a glass plate 86, a conductive transparent layer 84 deposited on the side of plate 86 exposed to the electron guns, and a thin layer 82 of phosphor deposited on layer 84. If the tube is to be used for color presentations, layer 82 is composed of different colored phosphor stripes, the number and arrangement depending on the resolution desired and the type of scanning to be used. Alternatively, conductive layer 84 may be applied over layer 82 by evaporating a thin film of aluminum, for example.

Transparent conductive layers of the type used are known in the art by various names, one of them being known as "NESA," which consists of an evaporated layer of stannous chloride. The methods of depositing such layers are known to the prior art obviating a more detailed description.

Conductive layer 84 is maintained at a high positive potential so that electrons passing through the interstices of storage screen 78 will impinge on phosphor layer 82. This result is accomplished by connecting conductive layer 84 to a positive terminal of potential source 90 through a lead 85. Representative values of the potential applied to layer 84 may range from +3000 to +20,000 volts with respect to ground.

The embodiment of the present invention illustrated in Fig. 1 functions generally in the following manner. Writing gun 12 produces an electron beam which under the control of scanning means 16 scans storage screen 78 in any desired manner such as, for example, a television-type or plan position indicator scan. In order to approach the performance of an ideal presentation device, each element of storage surface 80 of screen 78, upon bombardment by the "writing" or signal beam from writing gun 12, should assume a potential corresponding to the new signal regardless of whether the previous potential was below or above the new one. This characteristic may be achieved by making use of the secondary emission characteristic of the dielectric material of storage surface 80.

Figure 4:
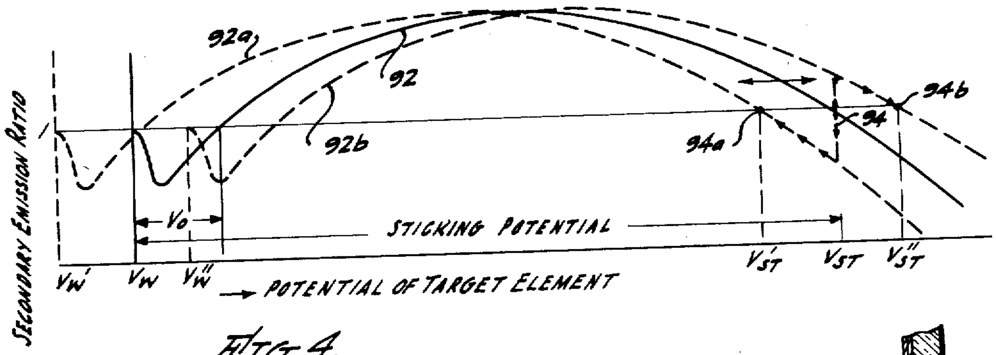
Fig. 4 illustrates a family of explanatory secondary emission curves.

Referring now to Fig. 4, there is shown a group of characteristic curves of the secondary emission ratio of dielectric material versus the electron volts of primary electrons incident on the dielectric material. The secondary emission ratio for a given material is defined as the ratio of the number of secondary emission electrons plus the number of reflected, repelled, or turned-back primary electrons picked up by the collector electrodes to the number of primary electrons incident on the material. There are two values of energy of bombarding electrons for materials for which the maximum secondary emission ratio is greater than unity at which the secondary emission ratio is equal to one. The first value is referred to as the critical potential, $V_0$, and is usually on the order of from 50 to 200 volts, while the second value is sometimes referred to as the sticking potential, $V_{st}$, and is usually of the order of from 2000 to 4000 volts. The potential of the electrode collecting secondary emission electrons, which in Fig. 1 is collector electrode 62, is maintained sufficiently high so that even when the storage surface element is at the sticking potential the secondary electrons can be drawn away from it. In this manner, the potential of the bombarded storage element may be changed by varying the potential of cathode 22 of writing gun 12. In other words, the bombarded element of storage surface 80 will assume a potential equal to the potential of cathode 22 of writing gun 12 plus the sticking potential which remains constant. The sticking potential magnitude depends upon the characteristic of the material of which the bombarded surface is composed. Therefore, if the whole storage surface is scanned by the writing beam while the potential of writing gun cathode 22 remains constant, the entire storage surface exposed to the writing beam will assume a potential equal to the sticking potential relative to the potential of the writing gun cathode 22. However, if during the scan, the potential of cathode 22 is modulated by the signal voltage, then the different elemental areas of surface all assume the potential corresponding to the instantaneous value of the cathode potential plus the sticking potential.

In greater detail, the process of charging an element of storage screen 78 is as follows: Assume that due to a previous scan, with the potential of cathode 22 equal to $V_w$, an element of storage surface was charged to a potential $V_{st}$ as illustrated in Fig. 4. During the present scan, the potential of the cathode 22 of the writing gun 12 has assumed a new value $V'_w$ which is negative with respect to $V_w$, owing to the input signal modulation. At the beginning of the bombardment of an element of screen 78 by the writing beam the electrons will be arriving at the element with energy greater than the sticking potential energy by the amount $(V_w-V'_w)$. As a result, the secondary emission ratio will be less than one, the net flow of current to the element will be negative and the potential of that element will decrease in the negative direction along curve 92*a* towards the stable point 94*a* corresponding to the potential $V'_{st}$.

Similarly, if during a subsequent scan by the writing beam, the new potential of cathode 22 is $V''_w$ which is positive with respect to $V_w$, a positive charge will flow to the element to increase its potential in a positive direction along curve 92*b* to a new stable point 94*b* having a value $V''_{st}$ as shown in Fig. 4. Therefore, if the sticking potential energy is the same for all elements of storage surface 80, the bombardment of the storage screen by the modulated writing beam will result in establishing a potential distribution over storage surface 80 corresponding to the instantaneous magnitude of the signal voltage during the scanning period.

Due to the capacitance, C, to mesh 76 of the storage elements, it takes a total charge equal to $$\int_0^T idt=C\Delta V$$

to change the potential of the element by $\Delta V$ volts, where the effective net current flowing to the element is $i$ and the total time of bambardment of one element is T. If the writing beam current is low, i. e., $i$ is small, then, the net charge delivered to one element during the bombardment of the element may be insufficient to charge its potential by the total possible amount of $\Delta V$ volts. Therefore, under the condition when $i$ or T is small it may take several scans to bring the element to the new value. This, then, would be the mode of operation of the storage tube of the present invention when signal integration is desired.

In order to achieve a flow of electrons emanating from cathode 70 of flood gun 14 through the interstices or foramina of storage screen 78 and contrast control grid 76 which would correspond to the potential distribution on storage surface 80, the potential of cathode 70 of flood gun 14 relative to the potential of contrast control grid 76 is adjusted so that for "black" parts of the picture no current can flow through the interstices, and for highlights essentially maximum current can flow through. If the effective velocity spread of electrons from flood gun 14 is small, the optimum potential of flood gun cathode 70 will be within a few volts of the average potential $V_{st}$ of storage surface 80.

The representative values of the potentials may be summarized as follows: Referring to Fig. 1—

Potential of writing gun cathode 22=−3000 volts relative to ground;

Sticking potential of storage surface 80=3000 volts relative to writing gun cathode 22;

Potential of collector electrode 62=500 volts relative to ground;

Approximate potential of flood gun cathode 70 is 50 volts relative to ground;

Potential of transparent conducting layer 84=+10,000 volts relative to ground; and Potential of contrast control grid 76=+100 volts relative to ground.

The potential of the writing gun cathode 22 is modulated by a signal applied at terminal 15, Fig. 1, the signal modulation being applied through capacitor 19 to both cathode 22 and control grid 24 of writing gun 12 by means of conductors 27 and 26 and bypass capacitor 29. The average value of the writing beam current can be adjusted to a desired value by means of variable intensity grid biasing source 28 depending on the desired mode of operation. For the normal mode of operation of the storage tube of the present invention the writing beam current will be sufficiently high so that even for the strongest signals the total charge delivered to an element $$\int_0^T idt$$

will be sufficient to raise the potential of the element by an amount equal to the signal voltage. However, if signal integration is desired, the writing beam current will be such that the signal voltage is greater than $$\frac{1}{C}\int_0^T idt$$

so that full charging will occur only after several scans of the writing beam.

In order to prevent the electrons from flood gun 14 from discharging the elements of the storage surface 80, the potential of flood gun cathode 70 is held at a value more positive than the maximum potential of any element on storage surface 80. The flood electrons will be able to penetrate through the interstices of the screen 78 in spite of the fact that an element on storage surface 80 may be at a more negative potential than the potential of holding gun cathode 70 if contrast control grid 76 is maintained at a potential somewhat above the potential of flood gun cathode 70.

Figure 5:
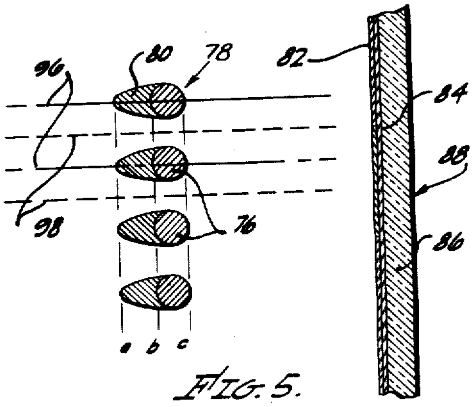
Fig. 5 illustrates an enlarged sectional view of the storage screen with respect to the viewing screen for the tube illustrated in Fig. 1.
Figure 6:
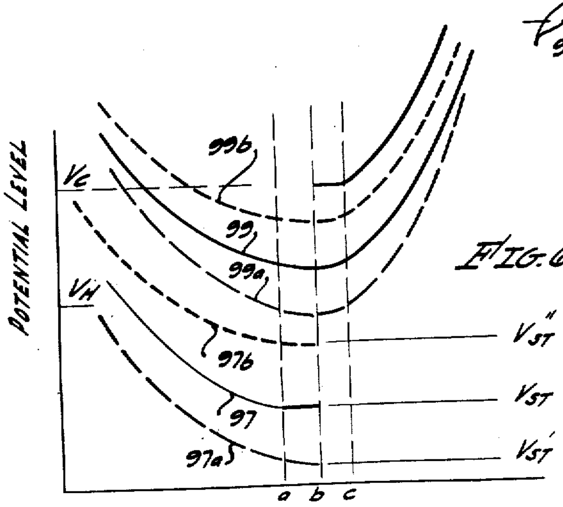
Fig. 6 is a plot of potential levels encountered by flood electrons for the tube illustrated in Fig. 1 with reference to the enlarged sectional view of Fig. 5.

Referring now to Fig. 5, there is illustrated an enlarged cross-sectional view of storage screen 78 and viewing screen 88 with a pair of center lines 96 for a pair of wire elements of contrast control grid 76 and the associated dielectric material of storage surface 80, and a pair of center lines 98 for the interstices of storage screen 78. Fig. 6 shows a plot of potential distribution along lines 96 and 98, as defined in Fig. 5, for the three situations illustrated in Fig. 4 wherein the writing gun cathode is at potentials $V'_w$, $V_w$ and $V''_w$, respectively. In this case potential of contrast control grid 76 is assumed to be somewhat higher than the potential of flood gun cathode 70, say by 50 volts.

When an element of storage surface 80, comprising approximately twenty meshes of the storage screen structure, is charged by the writing beam to the potential $V'_{st}$, the effective potential level in passing through the interstices by way of lines 98 is illustrated by plot 99*a* of Fig. 6. Since the potential level of this plot goes negative with respect to the potential $V_H$ of flood gun cathode 70, the electrons from flood gun 14 will not be able to pass through the interstices and will be returned towards electrodes 56 and 60 and collector electrodes 62.

When a storage surface element is charged by the writing beam to the sticking potential $V_{st}$, the effective potential level in passing through the interstices by way of lines 98 is illustrated by curve 99 of Fig. 6. Assuming a certain velocity distribution due to emission velocity spread and due to deviation from normal incidence, the electrons of high velocities in the forward direction will penetrate through the interstices and produce luminescence on viewing screen 88.

When a storage surface element is charged by the writing beam to the still higher potential $V''_{st}$, the effective potential level in passing through interstices by way of lines 98 is illustrated by curve **99*b* of Fig. 6. In this case practically all of the electrons from holding gun 14 directed toward this element will be able to penetrate through storage screen 78** thereby producing the brightest spots in the picture.

It is important to note that with this arrangement, storage surface 80 remains always at a potential that is negative with respect to that of flood gun cathode 70, so as to repel the electrons from flood gun 14. Therefore, the potential distribution imposed by the signal on storage surface 80 will not be disturbed by the continuous flow of electrons through the interstices. This potential distribution is illustrated by potential level curves **97*b*, 97, 97*a*, of Fig. 6, for the paths following lines 96, Fig. 5 for the three conditions previously described in Fig. 4 wherein the potential of writing gun cathode takes on values $V'_w$, $V_w$ and $V''_w$, respectively. As can be seen from Fig. 6, the highest potential $V''_{st}$ reached by a storage surface element is still negative with respect to the potential $V_H$ of flood gun cathode 70** and hence electrons will not impinge thereon.

The only charges, other than from writing gun 14, which may impinge on the storage surface are the positive ions produced by ionization which will drift towards the storage surface and tend to raise its potential. However, with sufficiently good vacuum, it can be shown that the positive ion current will be sufficiently low so that any positive charging due to the positive ions will not be detrimental. For example, if one assumes a pressure of $10^{-8}$ millimeter of mercury, the mean free path for electrons will be of the order of $10^6$ millimeter. With an average electron path within the tube envelope of about 200 millimeters, it can be shown that the rate of change of potential on the storage screen will be on the order of 0.3 volt per second. This will not be detrimental if new signals are received a few times a second and the minimum signals are of the order of one volt.

Figures 7, 8, 9, 10:
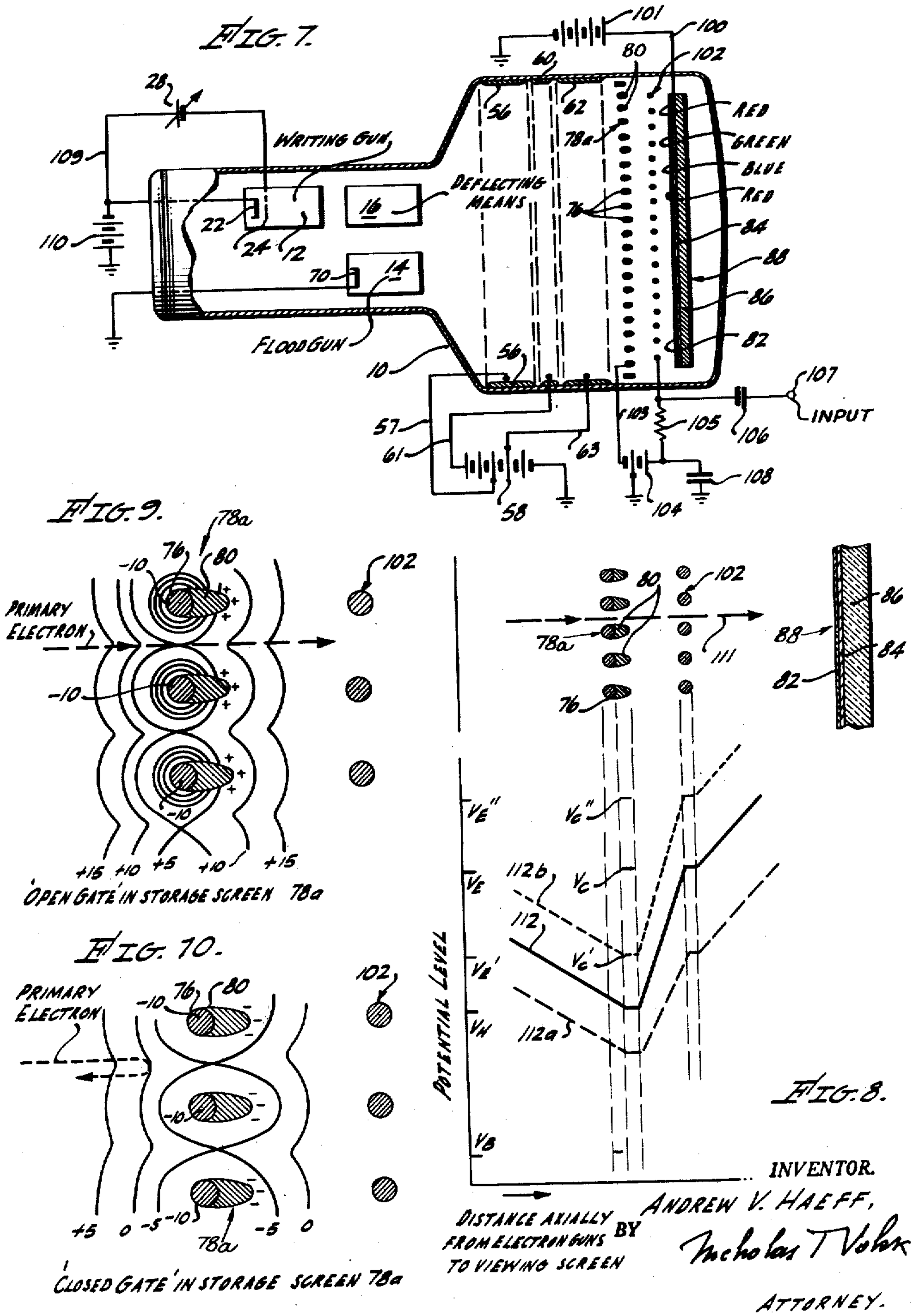
Fig. 7 illustrates a longitudinal sectional view of an alternative embodiment of a storage tube.
Fig. 8 illustrates a plot of potential levels encountered by flood electrons with reference to an enlarged sectional view of the storage screen, writing screen, and viewing screen for the tube illustrated in Fig. 7.
Fig. 9 shows the manner in which equipotential lines create an "open gate" action to flood electrons for the tube illustrated in Fig. 7.
Fig. 10 shows the manner in which equipotential lines create a "closed gate" action to flood electrons for the tube illustrated in Fig. 7.

Another embodiment of a storage tube capable of achieving the desired "ideal" presentation characteristic is illustrated in Fig. 7. The feature of this embodiment of the present invention is that uniformity of the sticking potential of the dielectric material deposited on the storage screen 78 is not essential, since the operation of the tube does not utilize this property of the dielectric. In this embodiment, a fixed predetermined potential of zero volts is produced between the element of the storage surface and a "writing screen" when scanned by the writing beam. Hence, a charge distribution, in accordance with a signal, is accomplished by modulating the writing screen with the signal while simultaneously scanning the writing beam over the writing screen.

The particular embodiment of the invention shown in Fig. 7 comprises an evacuated envelope 10, which in its left-hand portion, as viewed in the figure, has a writing gun 12 with appropriate electron beam deflecting means 16 together with a flood gun 14. The operation and construction of these units are the same as for the corresponding units described for the storage tube illustrated in Fig. 1, except that in this case no signal is applied to intensity grid 24 and cathode 22 of writing gun 12, flood gun cathode 70 is grounded, and writing gun cathode 22 is maintained at a negative potential for the reasons hereinafter set forth. This negative potential is applied to cathode 22 from a direct-current potential source 110, an appropriate value for the potential being −1000 volts with respect to ground. Intensity grid 24 is maintained negative with respect to writing gun cathode 22 by a connection through a lead 109 to a variable potential source 28. In the described mode of operation, no signal is applied to cathode 22 and hence no bypass capacitor around potential source 28 is required. The potential of variable potential source 28 is adjusted to produce the magnitude of writing beam current desired. Electrodes 56 and 60 and collector electrode 62 are maintained at the same potentials as specified for the tube illustrated in Fig. 1.

Facing the electron guns is a storage screen **78*a* which is similar to storage screen 78 illustrated in Figs. 1, 2 and 3, except that storage surface 80 is now placed on the side away from the electron guns. Metallic mesh support 76 of storage screen 78*a* is again used for contrast control, and will be referred to as contrast control grid 76. Contrast control grid 76 is biased with respect to the potential of flood gun cathode 70 by an amount equal to the maximum signal used which may be on the order of 10 volts. This potential is applied to contrast control grid 76 by a connection 103 to the negative terminal of a potential source 104**.

An auxiliary metal mesh 102 is positioned adjacent to and behind storage screen **78*a*, with respect to the electron guns, mesh 102 serving to control the charge distribution produced on storage surface 80 by the writing beam. A video signal and a quiescent direct-current potential are applied to metal mesh 102, the signal being impressed at a terminal 107 through a capacitor 106, and the direct-current potential through a resistor 105 from a connection to the positive terminal of potential source 104. Capacitor 108 is used to bypass any signal around potential source 104. Since metal mesh 102 is used to "write" information on storage surface 80, it will be hereinafter referred to as the "writing screen." The potential applied to writing screen 102 has a quiescent value that is positive with respect to the potential of contrast control grid 76 by an amount equal to approximately twice the maximum signal. The construction of writing screen 102 may be the same as previously specified for contrast control grid 76** described in connection with the tube illustrated in Fig. 1.

Adjacent to and behind writing screen 102, with respect to the electron guns, is viewing screen 88 similar in construction to that used in the storage tube illustrated in Fig. 1. A direct-current potential is applied to transparent conductive layer 84 of viewing screen 88 so that electrons passing through writing screen 102 will impinge on phosphor layer 82 with sufficient energy to emit a satisfactory amount of light. An appropriate value for this potential is of the order of +10,000 volts with respect to ground, and is applied through a lead 100 connected to the positive terminal of a potential source 101 the negative terminal of which is connected to ground.

As described for the storage tube illustrated in Fig. 1, a high velocity writing beam is again used to deposit charges on storage surface 80, and a flood gun 14 provides slow electrons to penetrate through the interstices of the more positively charged elements of the storage screen. As previously mentioned, storage screen **78*a* is similar to storage screen 78 of Fig. 1 except that storage surface 80** is now placed on the side away from the electron guns.

In the operation of the tube illustrated in Fig. 7, writing screen 102 is scanned by the writing beam charging each element of storage surface 80 to the potential of writing screen 102 at the time the element was scanned. A source of flood electrons is furnished by flood gun 16. The charges on storage surface 80 control the flow of the flood electrons through the interstices of storage screen **78*a* by means of a "gating action." The flood electrons then continue on through writing screen 102 to impinge on viewing screen 88. Since the flow of flood electrons through each element of storage screen 78*a* is controlled by the gating action produced by the charge thereon, the resulting image on storage screen 88 corresponds to the charge distribution on storage surface 80** and hence is in accordance with the modulating signal.

Figures 11, 13:
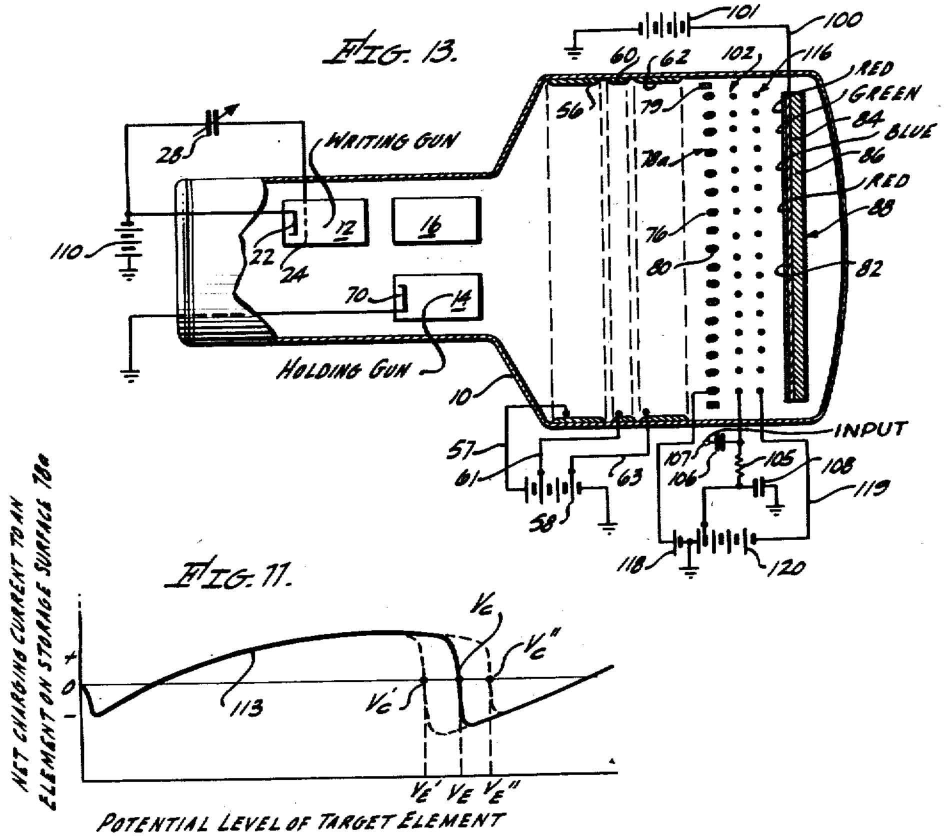
Fig. 11 shows the manner in which the writing screen charges the storage screen for the tube illustrated in Fig. 7.
Figs. 13, 14 and 18 illustrate longitudinal sectional views of three additional alternative embodiments of the direct-viewing color storage tubes.

To more completely explain the method of charging storage surface 80, reference is made to Fig. 11. In this figure, curve 113 represents the charging current to an element of storage surface 80 at the time of scanning by the writing beam. Potentials $V_E$, $V_E'$ and $V_E''$ represent, respectively, potentials assumed by writing screen 102 when modulated with a signal. In the case where the potential $V_E'$ of writing screen 102 is negative with respect to that of the corresponding storage surface element, the secondary electrons emitted from the writing screen due to bombardment by the high energy electrons of the writing beam are attracted to the more positive storage surface element thereby reducing its potential to a potential $V_c'$ equal to the potential $V_E'$ of the writing screen at the time of scanning.

In the case where writing screen 102 is at a more positive potential $V_E''$, than the corresponding storage surface element, reflected electrons from the writing beam, as well as high energy secondary electrons liberated from writing screen 102 by the writing beam, will produce a secondary emission ratio greater than unity from the storage surface element. Since the writing screen 102 is at the more positive potential, the secondary electrons liberated from the storage element will be attracted to the writing screen 102 thereby raising the potential of the storage surface element until to a value $V_c''$ equal to potential $V_E''$ of the writing screen. Thus, when bombarded by the writing beam, the corresponding elements on storage surface 80 will tend to assume potentials, $V_c'$ and $V_c''$, equal, respectively, to the instantaneous potentials, $V_E'$ and $V_E''$ of writing screen 102, irrespective of the prior charge on the storage surface element. The potential $V_E$ represents the quiescent value of potential for the writing screen 102, the potential on the corresponding storage screen element being equal to $V_E$ and designated as $V_c$.

Referring to Fig. 8, there is illustrated the manner in which contrast control grid 76, writing screen 102, and flood gun cathode 70 should be biased in order that the flow of flood electrons from flood gun 14 shall be controlled by the storage surface potential and not be influenced appreciably by the signal voltage on writing screen 102. With the potential of flood gun cathode 70 represented by $V_H$, the potential of contrast control grid 76 represented by $V_B$, the potentials of storage surface elements represented by $V_c'$, $V_c$ and $V_c''$, corresponding, respectively, to instantaneous potentials, $V_E'$, $V_E$ and $V_E''$ assumed by writing screen 102 at the time of bombardment by the writing beam, the potential levels are as illustrated in Fig. 8.

Referring to Fig. 8, line 112 shows the potential level in proceeding through an opening of storage screen 78*a* along an electron path 111, the particular element containing the opening being charged at a time when writing screen 102 was at the quiescent value of potential $V_E$. As the potential level along line 112 decreases until it is just equal to the potential $V_H$ of flood gun cathode 70 and assuming a certain amount of "spread" in the velocities of the electrons emanating from flood gun 14, some electrons will pass through to writing screen 102 and others will be turned back.

Line 112*b* shows the potential level in proceeding through an opening of storage screen 78*a* along electron path 111, the particular element containing the opening being charged at a time when writing screen 102 was positive with respect to its quiescent value of potential $V_E$. In this case, all incident electrons on the element will pass through the openings as there is no point that is negative with respect to the potential of flood gun cathode 70. This condition is representative of a bright spot of the picture.

Referring still to Fig. 8, line 112*a* shows the potential profile in proceeding through an opening of storage screen 78*a* along electron path 111, the particular element containing the opening being charged at a time when writing screen 102 was negative with respect to its quiescent value of potential $V_E$. Since the potential level in this instance goes negative with respect to the potential of flood gun cathode 70, no electrons from flood gun 14 will pass through the openings of this element. This condition is representative of a dark spot on the picture.

After passing through storage screen 78*a*, very few electrons will impinge on the structure of writing screen 102, but will proceed onto the viewing screen 88. It is to be understood that artificial velocity spread of electrons from holding gun 14, as described for the tube illustrated in Fig. 1, can also be used with this storage tube, if desired. As the principle is the same as for the previous tube, the description will not be repeated.

In order to understand more fully the gating action of the storage screen meshes, reference is made to Figs. 9 and 10, wherein the equipotential lines are labeled with respect to the potential of flood gun cathode 70. In Fig. 9, equipotential lines are sketched for an element of storage screen 78*a* for an "open" gate. The positive charge deposited on the storage surface element results in a positive field penetration through the meshes of the element such that no equipotential lines of zero volts with respect to the potential of flood gun cathode 70 extend completely across the openings of the element. Hence, as illustrated in Fig. 9, the primary electron emanating from the flood gun 14 will penetrate through the opening of the storage element and continue on through writing screen 102 to impinge on viewing screen 88, since at no time was its velocity in the forward direction reduced to zero.

Illustrated in Fig. 10, equipotential lines referenced to the potential of flood gun cathode 70 are sketched for an element of storage screen 78*a* for the "closed" gate action. As shown in Fig. 10, the primary electron from flood gun 14 is repelled when it reaches the equipotential line of zero volts and, hence, cannot continue on to impinge on the viewing screen 88.

Because of the configuration of the equipotential lines in the vicinity of storage surface 80, as shown in Figs. 9 and 10, a negligible amount of current will flow to storage surface 80 due to the continuous "flooding" stream of electrons from the flood gun 14. The fact that the storage material is deposited on the side of storage screen 78*a* away from the electron guns also insures low value of stray currents to storage surface 80, either due to low velocity electrons from flood gun 14 or due to positive ions generated in the space between the electron guns and storage screen 78*a*. The optimum bias voltages applied to contrast control grid 76, writing screen 102, and flood gun cathode 70 are somewhat dependent upon their actual detailed geometry including the thickness of the dielectric islands comprising storage surface 80, the opening of the holes, the spacing between the storage surface 80 and the writing screen 102, the effective field penetration factor, $\mu$, of the writing screen 102, and the strength of the electric field between writing screen 102 and the viewing screen 88.

Figure 12:
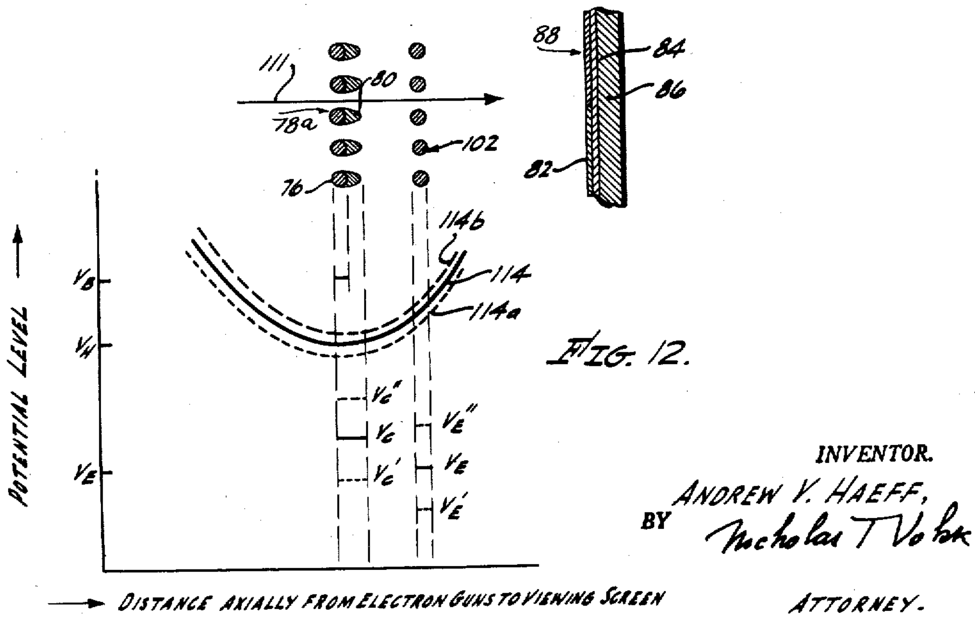
Fig. 12 shows a plot of the potential levels encountered by flood electrons with reference to an enlarged sectional view of the storage screen, writing screen and viewing screen for an alternate mode of operation of the tube illustrated in Fig. 7.

An alternative mode of operation for the storage tube illustrated in Fig. 7 is shown in Fig. 12 wherein the potentials $V''_c$, $V_c$ and $V'_c$ of the storage surface 80 as described in Fig. 11 are always negative with respect to the potential of flood gun cathode 70. Thus, in this mode of operation, the primary electrons from flood gun cathode 70 cannot reach the storage surface 80 and disturb the potential distribution imposed by the writing beam. This mode of operation can be realized due to penetration of the electrostatic fields through the interstices of the grids. In this manner, even though the grids themselves are negative with respect to the potential of flood gun cathode 70, the potential in the openings of storage screen 78*a* can be made somewhat positive so that the electrons can penetrate through to the grids.

Values of potential for this mode of operation will vary with the transparency and $\mu$ of the particular grids used. Representative values of potential with respect to ground are approximately as follows:

Potential $V_H$ of flood gun cathode 70=0 volts
Potential $V_B$ of contrast control grid 76=+20 volts
Quiescent potential $V_E$ of writing screen 102=−40 volts Referring to Fig. 12, lines **114*b*, 114, 114*a* represent the potential levels in proceeding along electron path 111 through storage screen 78*a* and writing screen 102 to viewing screen 88 for the situations where an element was charged to a potential $V''_c$, $V_c$, and $V'_c$, respectively, corresponding to instantaneous potentials $V''_E$, $V_E$, and $V'_E$, respectively, of writing screen 102. More particularly, the potential level along line 114*b* is always positive with respect to the potential of flood gun cathode 70. Accordingly, under these conditions, all primary electrons from flood gun 14 travelling along path 111 will proceed on through to viewing screen 88 resulting in a "white" spot in the presentation. Referring now to line 114, at one point therealong the potential level is equal to potential $V_H$ of flood gun cathode 70. Under these conditions and due to velocity spread, only a portion of the electrons proceeding along path 111 will reach viewing screen 88, others being repelled, resulting in a "gray" spot in the presentation. On the other hand, line 114*a*** shows the potential level for primary electrons attempting to traverse an opening in an element charged negative with respect to their source, hence all electrons will be repelled resulting in a "black" spot in the presentation.

The principle of penetration of fields through the interstices of the storage screen **78*a* and writing screen 102 can also be used with the tube of Fig. 7 together with an auxiliary writing screen 116** for increasing the number of high energy electrons which in turn increase the rate of positive charging by the writing beam. A tube of this type is shown in Fig. 13.

Referring now to Fig. 13, there is shown a storage tube similar to the storage tube illustrated in Fig. 7, except that auxiliary writing screen 116 is inserted between writing screen 102 and viewing screen 88 and the potentials applied to contrast control grid 76 and writing screen 102 are different. Contrast control grid 76 is maintained at a potential slightly positive with respect to the potential of flood gun cathode 70. This potential is impressed on contrast control grid 76 through a connection to the positive terminal of a potential source 118, a suitable value for which may be +10 volts with respect to the potential of flood gun cathode 70. A quiescent value of potential of approximately 20 volts negative with respect to that of contrast control grid 76 is impressed on writing screen 102 through resistor 105 from a terminal on a potential source 120. As before, signal voltages are impressed on terminal 107 through capacitor 106 to writing screen 102. A capacitor 108 bypasses signal voltages around potential source 120. Auxiliary writing screen 116 is maintained at a potential that is negative with respect to that of writing screen 102 by an amount greater than the "critical" potential for the dielectric material of storage surface 80. An appropriate value of this potential may be 200 volts negative with respect to writing screen 102.

In the operation of the tube of Fig. 13, in addition to secondary electrons being liberated by the high energy writing beam on the surface of writing screen 102, there will be additional secondary electrons liberated on the surface of auxiliary writing screen 116. If the potential of auxiliary writing screen 116 is maintained at a value below that of writing screen 102 by an amount more than the critical potential, the secondary electrons from auxiliary writing screen 116 will arrive at the storage surface 80 with sufficient energy to produce a net positive charging on storage surface 80 when the potential of the element on storage surface 80 is negative with respect to that of writing screen 102. The potential profile through the holes of storage screen **78*a*, writing screen 102, and auxiliary writing screen 116 will be similar to that shown in Fig. 12 where the field due to high voltage on viewing screen 88 penetrates through the holes and neutralizes the effect of negative biasing potential on auxiliary writing screen 116** if the field penetration factor $\mu$ of the screen is reasonably low.

Figure 14:
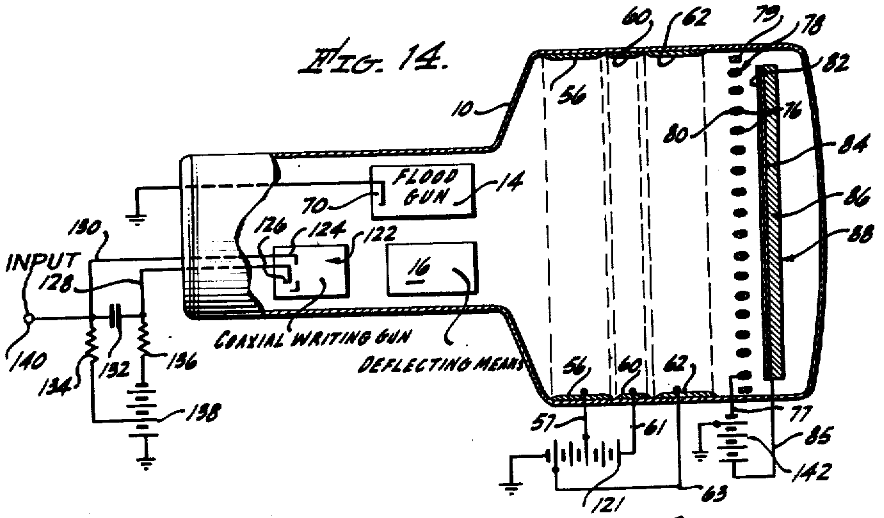

Still another modification of the disclosed invention capable of resetting or converting the charge distribution is shown in Fig. 14. Here, the screen arrangement, and the action of the storage surface 80 in controlling the flow of electrons from the flood gun 14 to the viewing screen 88, are similar to those of the storage tube illustrated in Fig. 1, the difference residing in the means for charging the storage surface 80. In the tube of Fig. 14, the storage surface is bombarded with a writing beam consisting of two components having different velocities. This can be achieved by using two coaxial cathodes 124 and 126, so arranged that electrons from cathode 126 can penetrate through an opening in circular cathode 124 in such a manner that the two beam components can be accelerated and focused by a coaxial writing gun 122, and deflected together by common deflecting means 16.

The potential difference between cathode 124 and cathode 126 should be approximately twice the critical potential $V_0$ of the dielectric material of storage surface 80. Assuming a critical potential $V_0$ of 100 volts, the potential difference between the coaxial cathodes would then be 200 volts. Cathode 124 is maintained at a quiescent potential equal to −10 volts with respect to ground by impressing the appropriate potential from a potential source 138 through a resistor 134 and a lead 130. Cathode 126 is maintained at a quiescent potential of approximately 210 volts negative with respect to ground by impressing an appropriate potential from a connection to a tap on potential source 138 through a resistor 136 and a lead 128. A signal, appearing on an input terminal 140, is applied to cathode 124 through the lead 130 and to cathode 126 through a capacitor 132 and lead 128, resistors 134 and 136 isolating the cathodes from potential source 138 which is essentially an alternating-current ground.

It should be noted that the beam electrons from the two cathodes have different velocities owing to the 200 volt potential difference between the cathodes and, hence, will be affected differently by the deflecting means regardless of whether electrostatic or electromagnetic means are used. In order to minimize this effect, it is preferable to use a high accelerating potential in coaxial writing gun 122. The actual accelerating potential used is a function of the size of the tube presentation, the resolution, the distance of the electron guns from the storage surface, and the type of deflecting means used.

Electrodes 56, 60 and 62 constitute an "optical" system for electrons emanating from flood gun 14, functioning so as to diffuse the electrons evenly over the exposed surface of storage screen 78 and alter their trajectory so that they approach towards storage surface 78 at approximately normal incidence. Suitable potentials for electrodes 56, 60 and 62 are +1500, +5000, and +40 volts, respectively, applied from appropriate taps of potential source 121 through leads 57, 61, and 63, respectively. Contrast control grid 76 is maintained at a potential slightly negative with respect to that of flood gun cathode 70. If the potential of flood gun cathode 70 is fixed at ground, an appropriate potential for contrast control grid 76 would be of the order of −10 volts with respect to ground. This potential is impressed through a lead 77 from a terminal on a potential source 142. As before, transparent conductive layer 84 of viewing screen 88 is maintained at a potential of 10,000 volts positive with respect to that of flood gun cathode 70. This potential is impressed through a lead 85 from potential source 142.

Figure 15:
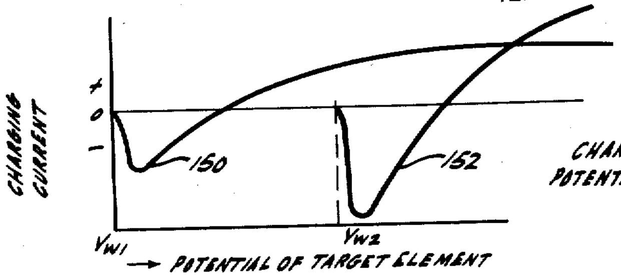
Figs. 15, 16, 17 and 19 are explanatory secondary emission curves.
Figure 16:
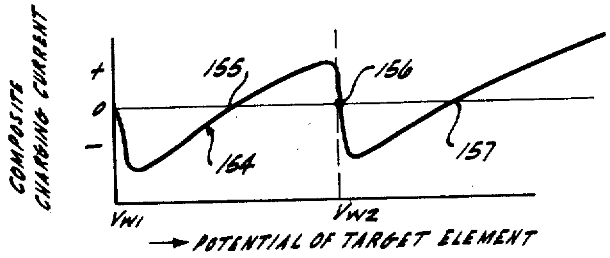
Figure 17:
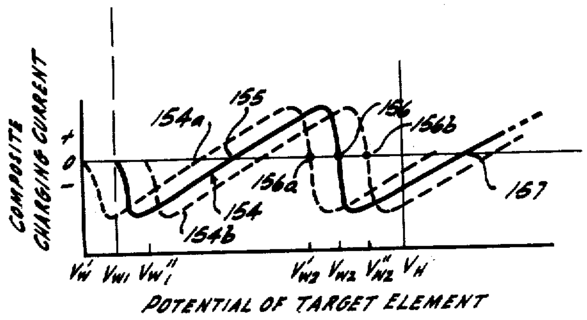

In order to explain how storage surface 80 may be charged in a positive or negative direction, depending upon the instantaneous potential of cathodes 124 and 126 and upon the instantaneous value of the surface potential of the target element bombarded by the concentric writing beams, reference is made to Figs. 15, 16 and 17.

In Fig. 15, line 150 is a graphical representation of the net charging current to a target element from the beam electrons emanating from cathode 126 for various target element potentials relative to potential $V_{w1}$ of cathode 126. Similarly, line 152 is a graphical representation of the net charging current to a target element from the beam electrons emanating from cathode 124, the potential of cathode 124 being designated as $V_{w2}$. Potential $V_{w2}$ is adjusted to be positive with respect to potential $V_{w1}$ by approximately twice the critical potential $V_0$ for storage surface 80. In this particular case, $V_0$ is assumed to equal 100 volts, hence $V_{w2}$ will be 200 volts positive with respect to $V_{w1}$.

Since the beam electrons from both cathodes act on the same target element at the same time, the composite beam resulting therefrom may be considered as a coaxial writing beam. The net effect of the coaxial beam is the composite charging current represented graphically 154 as illustrated in Fig. 16. The current densities of the two beams are preferably such that there is "half-wave conjugate symmetry" about zero cross-over point 156 of line 154. The potential differences from zero cross-over points 155 to 156 and 156 to 157 are each approximately equal to the critical potential $V_0$. From the standpoint of being able to "reset" a charge in either direction, the impressed signal must always be less than 0.5 $V_0$. In the suggested mode of operation, a maximum signal equal to 0.1 $V_0$ is recommended.

Referring now to Fig. 17, the method of charging each storage element of surface 18 may be explained in the following manner. The initial potential applied to contrast control grid 76 is 10 volts negative with respect to the potential $V_H$ of flood gun cathode 70, and by capacitor action, the initial potential of storage screen 80 will be equal to that of contrast control grid 76. As shown in Fig. 17, this initial potential falls between zero cross-over points 155 and 157 of line 154. Therefore, upon the application of the coaxial writing beam to storage surface 80 the potential of storage surface 80 will change to the potential corresponding to cross-over point 156 which is approximately equal to potential $V_{w2}$ of cathode 124.

The modulating signal, applied to both cathodes 124 and 126 simultaneously, has the effect of shifting line 154 in either direction in accordance with the applied signal. For example, dashed line 154*a* represents graphically the shifted charging current resulting from the application of a negative signal. The net charging current to the target element will then be negative and its potential will be reduced to the stable potential corresponding to point 156*a* of line 154*a*. On the other hand, if a positive signal is applied, line 154 is shifted in the opposite direction, as indicated by dashed line 154*b*. In this case, the net charging current to the target element will be positive and its potential will be raised to the stable potential corresponding to the potential of point 156*b* of line 154*b*. Therefore, since the zero cross-over points 156*a*, 156, and 156*b* are approximately equal to the instantaneous potentials $V'_{w2}$, $V_{w2}$ and $V''_{w2}$, respectively, of cathode 124, the charge on storage surface 80 will be representative of the signal applied to cathodes 124 and 126 and have an average value equal to the average potential of cathode 124.

The potential $V_H$ of flood gun cathode 70 is adjusted to a value greater than the maximum potential assumed by storage surface 80 so that no electrons from flood gun 14 can ever reach storage surface 80. The bias on contrast control grid 76 is adjusted to give the best contrast for the picture appearing on the high voltage viewing screen 88. As before, electrons from holding gun 14 will penetrate through the interstices of storage screen 78 in proportion to the charge deposited thereon producing a continuous picture in accordance with the impressed signal.

It is especially pointed out that in each of the foregoing embodiments of the disclosed invention, the charge pattern on the storage screen is reset or converted by each application of the signal, so that primary electrons from the flood gun produce a continuous image on the viewing screen in accordance with the charge pattern on the storage screen. Also, as mentioned in connection with the storage tube illustrated in Fig. 1, the use of colored phosphor stripes on the viewing screen to produce a colored presentation is applicable to any storage tube described in this patent disclosure.

Figure 18:
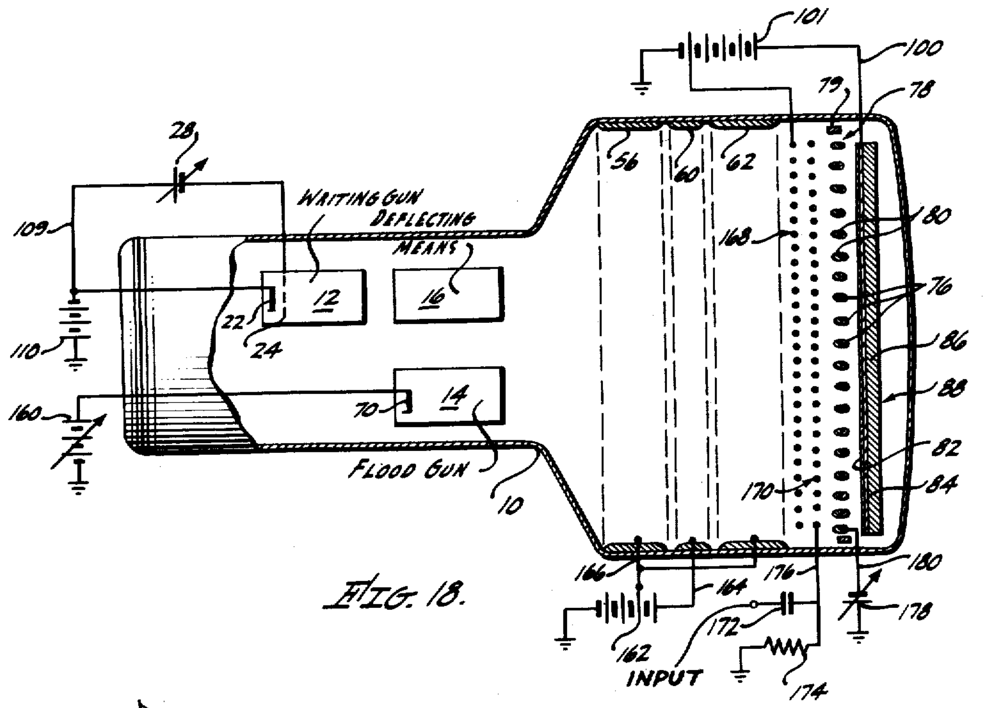

Still another tube capable of performing the methods of this invention is illustrated in Fig. 18. This tube comprises an evacuated envelope 10, writing gun 12 with deflecting means 16, flood gun 14, electrodes 56, 60, and 62, auxiliary grid 168, collector grid 170, storage screen 78 and viewing screen 88. Writing gun cathode 22 is maintained at a potential negative with respect to ground by a connection to potential source 110, a representative value of the potential applied to cathode 22 being of the order of −1000 volts. Intensity grid 24 of gun 12 is maintained negative with respect to cathode 22 by variable potential source 28 connected by lead 109 between grid 24 and cathode 22. The potential of source 28 is adjusted to produce a suitable value of writing beam current and may be of the order of −50 volts.

As in the previous embodiments, the potential of flood gun cathode is maintained positive with respect to the maximum potential on storage screen 78. This maximum potential is determined by the maximum potential assumed by collector grid 170 which has a quiescent potential of zero with respect to ground since it is connected by a lead 176, a resistor 174 to ground. A signal which, for example, may range from −10 to +10 volts is applied to collector grid 170 through a capacitor 172 and the lead 176, the resistor 174 isolating the signal from ground. Hence the maximum value of potential assumed by collector grid 170 will be of the order of +10 volts with respect to ground, and therefore, the potential of flood gun cathode 70 is maintained at a potential of the order of +10 volts with respect to ground. This is accomplished by connecting cathode 70 to a variable potential source 160.

Facing the electron guns in the sequence named are an auxiliary grid 168, collector grid 170, storage screen 78, and viewing screen 88. Auxiliary grid 168 and collector grid 170 are conventional grid structures of fine mesh screen having a mesh count approximately equal to the mesh count of storage screen 78. It is preferable that the transparency of grids 168 and 170 be greater than 50%. Storage screen 78, as previously described comprises a storage surface 80 supported by contrast control grid 76. Viewing screen 88 is the same as used in the previously described storage tubes.

Electrodes 56, and 60 with suitable potentials applied as previously described, constitute the electron optical system for the flood electrons so that the flood electrons diffuse evenly and at normal incidence over the grid structures. Suitable potentials for electrodes 56 and 60, are 1500 and 3000 volts, respectively, with respect to ground, and are applied through respective leads 166 and 164 from taps on a potential source 162.

In this embodiment of the disclosed invention, the high velocity writing beam charges the storage surface 80 to the potential of the collector grid 170 to which the signal is applied. The charges deposited on storage surface 80 by the writing beam then control the passage of flood electrons through the interstices of storage screen 78 to viewing screen 88. The potential of flood gun cathode 70 and that of contrast control grid 76 are adjusted for best contrast. An appropriate potential, such as −20 volts with respect to ground, is impressed on contrast control grid 70 by means of a lead 180 connected to a variable potential source 178.

To enable the flood electrons to penetrate through collector grid 170, auxiliary grid 168 is maintained at a suitable positive potential with respect to ground, this potential being on the order of 300 volts which is applied from a tap on potential source 101. Electrode 62 is maintained at a high positive potential with respect to ground, such as 1500 volts, by means of a lead 166 connected to a positive terminal on potential source 162. Thus, even though the potentials of collector grid 170, storage surface 80, and contrast control grid 76 are negative with respect to that of flood gun cathode 70, there is sufficient field penetration from auxiliary grid 168 through to viewing screen 88 to enable flood electrons to traverse the interstices thereof in proportion to the charge on storage surface 80. Hence, the flood electrons pass through the interstices of storage screen 78 in proportion to the charge pattern thereon, this charge pattern resulting from the action of the writing beam in accordance with a signal applied to collector grid 170. As before, viewing screen 88 is maintained at a positive potential of the order of 10,000 volts with respect to ground by means of a connection over lead 100 to potential source 101.

Figure 19:
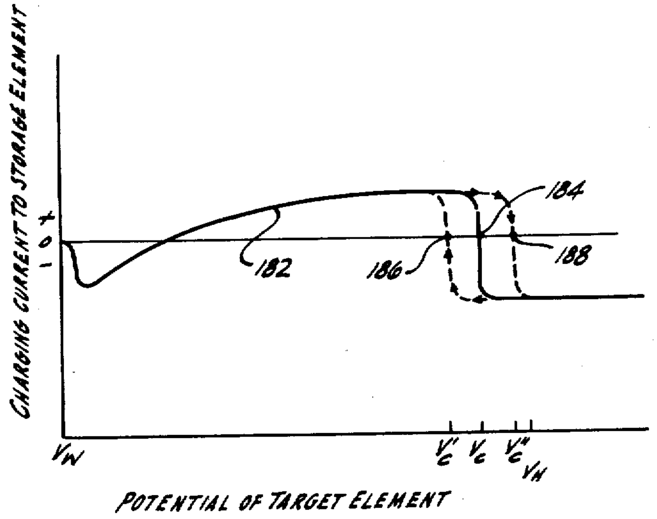

It is especially pointed out that the action of the writing beam on storage surface 80, in conjunction with the modulated collector grid 170, is capable of resetting the charge on storage surface 80 irrespective of its former value. To more fully explain this phenomenon, reference is made to Fig. 19. Line 182 shows a graphical representation of the net charging current as a function of writing gun cathode to target potential, the potential of the collector grid 170 being maintained at $V_c$. The writing beam will charge the target to a potential corresponding to stable point 184, the potential at this point being equal to the potential $V_c$ of collector grid 170.

If the potential $V_c$ of collector grid 170 is subsequently lowered to $V'_c$ by modulating it with the applied signal, a negative charging current will flow to the target until the potential corresponding to the point 186 is reached. Similarly, if the collector grid potential is raised $V''_c$, a positive charging current will flow to the target until the potential corresponding to the point 188 is reached.

Therefore, if the storage screen is scanned while the collector grid 170 is modulated with a signal, the charge pattern resulting on storage surface 80 is the applied signal. This charge pattern on storage surface 80 controls the flow of flood electrons through to viewing screen 88 where their kinetic energy is converted into light. The potential of flood gun cathode 70 is maintained positive with respect to the potentials on storage surface 80 so as not to alter the charge pattern deposited thereon by the writing beam.

What is claimed as new is:

1. An electronic tube including first means for producing an electron beam of elemental cross sectional area; second means for producing a broad beam of flood electrons of substantially uniform density; a foraminous storage screen having a storage surface on one side thereof, said storage surface being disposed in the path of said electron beams; a collector grid disposed adjacent to and in register with said storage screen on said one side thereof, said collector grid being coupled to a source of signals for modulating its potential; third means for scanning said storage surface with said beam of elemental cross sectional area for simultaneously charging each scanned element of said storage surface to the instantaneous potential of said collector grid at the time said elemental area is scanned whereby a charge distribution is produced on said storage surface corresponding to the signal modulating said collector grid, said charge distribution controlling the flow of said flood electrons passing through the foramina of said storage screen; a viewing screen disposed adjacent to and in register with said storage screen on the other side thereof; and means for maintaining predetermined potentials on said storage screen and said viewing screen for directing said flood electrons passing through said foramina to said viewing screen in a collimated beam to produce a continuous visual presentation of said charge distribution.

2. A direct-viewing electronic storage tube for converting an applied electrical signal into a visual presentation, said tube comprising an evacuated envelope; a foraminous storage screen within said envelope, said storage screen including a layer of dielectric material for providing a storage surface; means, within said envelope, responsive to the applied signal for charging said storage surface in either a positive or negative direction to produce an electrical charge replica of said signal thereon; a viewing screen within said envelope, said viewing screen being disposed contiguous to said storage screen; and means impressing predetermined potentials on said storage screen and said viewing screen for making said flood electrons pass through the foramina included in each of said storage elements in proportion to the charge on said storage surface and for directing said flood electrons passing through said foramina in a collimated beam to said viewing screen to produce the visual presentation of the electrical charge replica on said storage surface.

3. A direct-viewing electronic storage tube for presenting a visual presentation of an image signal, said tube comprising means for producing an electron beam of elemental cross sectional area; storage screen means including a layer of nonconductive dielectric material for providing a storage surface; an electrical deflection system for deflecting said beam over said storage surface; electrical control means for controlling the charges placed on said storage surface in cooperation with said electron beam and said storage screen means in response to the image signal, an elemental area of said storage surface being charged to a potential corresponding to the value of the image signal at the instant said beam is deflected thereover, the potential on said one elemental area of storage surface remaining substantially constant until said beam is again deflected thereover because of the nonconductive property of said layer of dielectric material; a viewing screen disposed contiguous to and in register with said storage screen means; a source of flood electrons; means connected to said source of flood electrons, said means maintaining said source of flood electrons at a predetermined potential level positive with respect to the potentials on said storage surface; and potential means for directing said flood electrons through the interstices included within each elemental area of said storage surface in porportion to the charge thereon in a collimated beam to said viewing screen to produce the visual presentation of the image signal.

4. A direct-viewing electronic storage tube for converting an electrical signal into a visual presentation, said tube comprising an evacuated envelope; a foraminous storage screen within said envelope, said storage screen including a layer of nonconductive dielectric material on one side thereof for providing a storage surface; means for generating an electron beam of elemental cross sectional area; means for directing said electron beam of elemental cross sectional area towards said storage screen to bombard successive elemental areas of said storage surface, secondary electrons being emitted from said storage surface in response to the bombardment by said electron beam; collecting means for collecting said secondary electrons to charge, in cooperation with said electron beam and in response to the electrical signal, each bombarded elemental area of said storage surface to a potential corresponding to the relative magnitude of the electrical signal at the instant said respective elemental areas of storage surface are charged; a viewing screen within said envelope, said viewing screen being disposed adjacent to and in register with said storage screen on the other side thereof; means for directing a broad beam of flood electrons uniformly over the area of said storage screen; and means impressing predetermined potentials on said storage screen and said viewing screen for making said flood electrons pass through the foramina included within each elemental area of said storage surface in proportion to the charge thereon and for directing said flood electrons passing through said foramina in a collimated beam to said viewing screen to produce a visual presentation of the charges on said bombarded elemental areas of storage surface.

5. A direct-viewing electronic storage tube for converting an electrical signal into a visual presentation, said tube comprising a foraminous storage screen including a layer of dielectric material on one side thereof for providing a storage surface; means for directing an electron beam of elemental cross sectional area towards said one side of said storage screen; a collector grid disposed adjacent to said storage screen on said one side thereof, said collector grid being responsive to the electrical signal; electron deflecting means for deflecting said electron beam over said storage surface to charge each bombarded elemental area thereof to the potential of said collector grid at the instant said electron beam is deflected thereover; a source of flood electrons disposed on said one side of said storage screen; means for maintaining the potential of said source positive with respect to the potentials on said storage surface; means for directing said flood electrons uniformly over the area of said storage screen; field penetration means for causing said flood electrons to pass through the foramina included within each elemental area of storage surface in proportion to the charge thereon; a viewing screen disposed adjacent to and coextensive with said storage screen on the other side thereof; and means for impressing predetermined potentials on said storage screen and said viewing screen for directing said flood electrons passing through said foramina in a collimated beam to said viewing screen to produce a visual presentation of the charges on said storage surface.

6. The direct-viewing storage tube as defined in claim 5 wherein said means for directing said flood electrons uniformly over the area of said storage screen includes an auxiliary grid disposed adjacent to said collector grid in the path of said flood electrons and means for maintaining said auxiliary grid at a predetermined potential that is positive with respect to the potential of said source.

7. The method of producing a visual presentation of an image signal by means of a viewing screen disposed adjacent a storage screen having a secondary electron emissive storage surface, said method including the steps of generating an electron beam of elemental cross sectional area, directing said electron beam towards elemental areas of said storage surface in synchronism with the image signal and at a velocity greater than a velocity equivalent to the critical potential of said secondary electron emissive storage surface, collecting all secondary electrons emitted from said storage surface, varying the initial velocity of said electron beam towards each of said elemental areas of said storage surface in accordance with said image signal to produce an electric charge replica on said storage screen, and directing flood electrons through the interstices of said storage screen in proportion to the charge on said storage surface in a collimated beam to said viewing screen thereby to produce said visual presentation.

8. The method of producing a visual presentation of an image signal by means of a viewing screen disposed adjacent a storage screen having a secondary electron emissive storage surface, said method including the steps of generating an electron beam of elemental cross sectional area, directing said electron beam towards elemental areas of said storage surface in synchronism with the image signal at a velocity greater than a velocity equivalent to the critical potential of said secondary emissive storage surface, collecting secondary electrons emitted from said storage surface at potentials varying in accordance with the image signal to produce an exact electric charge replica of said potentials on said storage screen, and directing flood electrons through the interstices of said storage screen in proportion to the charge on said storage surface in a collimated beam to said viewing screen thereby to produce said visual presentation.

9. The method of producing a visual presentation of an image signal on a luminescent target with the aid of a foraminous member having a secondary electron emissive storage surface, said method including the steps of generating an electron beam of elemental cross sectional area, directing said electron beam towards elemental areas of said storage surface in synchronism with the image signal at a velocity greater than a velocity equivalent to the critical potential of said secondary emissive storage surface, collecting secondary electrons emitted from said storage surface at potentials varying in accordance with the image signal to produce an electric charge replica of said potentials, directing flood electrons having an energy level less than that of any elemental area of said storage screen uniformly over the area of said storage screen, effecting the penetration of the foramina included in each elemental area of said storage screen in proportion to the charge thereon by said flood electrons by means of electrostatic field penetration of said foraminous member, and directing said flood electrons penetrating through said foramina in a collimated beam to said luminescent target.

10. A direct-viewing electronic storage tube for presenting an applied electrical signal in the form of a visual image representing the instantaneous relative magnitudes of the applied signal, said tube comprising an evacuated envelope; a foraminous storage screen within said envelope, said screen including a layer of dielectric material on one side thereof for providing a storage surface; means responsive to the applied signal for charging elemental areas of said storage surface in either a positive or negative direction to produce a charge pattern thereon corresponding to the instantaneous relative magnitudes of the applied signal; a viewing screen disposed contiguous to and coextensively with said storage screen; means for directing flood electrons uniformly over the area of said storage screen; and means impressing predetermined potentials on said storage screen and on said viewing screen for causing said flood electrons to pass through the foramina of said storage screen in proportion to the charge on said elemental areas of storage surface and for directing flood electrons passing through said foramina in a collimated beam to said viewing screen to produce a visual image of the electrical charge pattern.

11. The storage tube defined in claim 10 wherein said means responsive to the applied signal includes a source of beam electrons, an electrical deflection system for scanning the beam electrons over said storage screen, and a collector grid positioned between said source and said storage screen, said collector grid being responsive to the applied signal for varying the electric field contiguous to said storage surface in accordance therewith.

12. An electronic tube comprising a source of signals, first means for producing an electron beam of elemental cross sectional area, said first means including a cathode coupled to said source for modulating the potential of said cathode with said signal, a foraminous storage including a metal mesh having an insulating layer composed of a dielectric material on one side thereof, said one side being disposed in the path of said beam, the outer surface of said layer forming a storage surface possessing a specific sticking potential with reference to the potential of said cathode for electrons incident thereon, second means for scanning said storage surface with said beam for simultaneously charging or discharging each scanned elemental area of said storage surface to a potential equal to the sticking potential relative to the instantaneous modulated potential of said cathode, thereby to provide a charge distribution on said storage surface corresponding to said signal, a viewing screen disposed coextensive with and adjacent to said storage screen on the other side thereof, a flood gun disposed on said one side of said storage screen for directing a broad beam of flood electrons of substantially uniform density towards said storage screen, flood electrons passing through the foramina of said storage screen in proportion to the charge thereon, and potential developing means connected to said storage screen and to said viewing screen for directing said flood electrons passing through said foramina in a collimated beam to said viewing screen to produce a visual image of said charge distribution.

References Cited in the file of this patent

UNITED STATES PATENTS

| | | |
|---|---|---|
| 2,122,095 | Gabor | June 28, 1938 |
| 2,259,507 | Iams | Oct. 21, 1941 |
| 2,532,339 | Schlesinger | Dec. 5, 1950 |

UNITED STATES PATENT OFFICE

CERTIFICATE OF CORRECTION

June 11, 1957

Patent No. 2,795,727

Andrew V. Haeff

It is hereby certified that error appears in the printed specification of the above numbered patent requiring correction and that the said Letters Patent should read as corrected below.

Column 3, line 68, for "plate 45" read --plates 45--; column 4, line 2, for "50, and" read --and 50,--; column 5, line 20, for "wih" read --with--; column 6, line 71, for "characteristic" read --characteristics--; column 8, line 54, after "case" insert --the--; column 15, line 23, after "graphically" insert --by line--; column 16, line 38, after "176," insert --through--; column 17, line 47, after "80 is" insert --representative of--; column 20, line 65, after "storage" insert --screen--.

Signed and sealed this 20th day of August 1957.

(SEAL)
Attest:
KARL H. AXLINE
Attesting Officer

ROBERT C. WATSON
Commissioner of Patents